F. PANTLIK.
MILK BOILER.
APPLICATION FILED SEPT. 11, 1916.
1,209,752.
Patented Dec. 26, 1916.
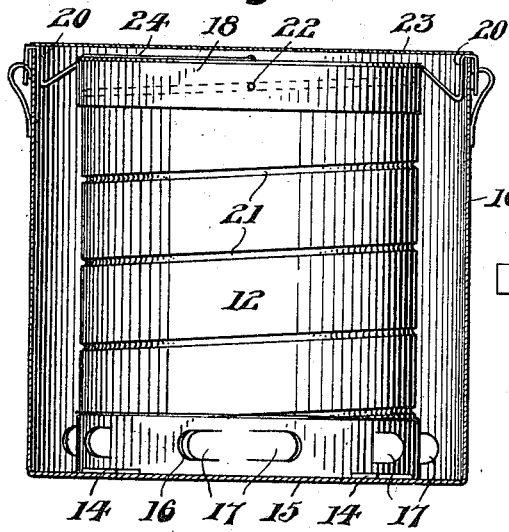
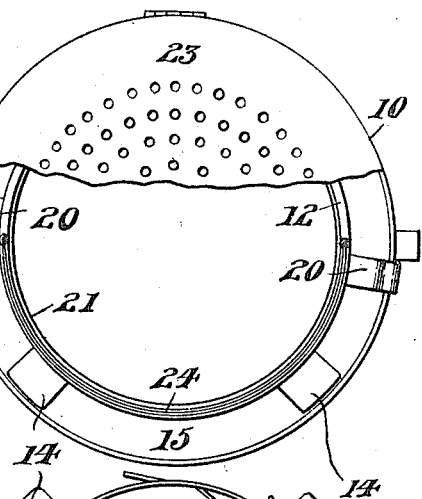
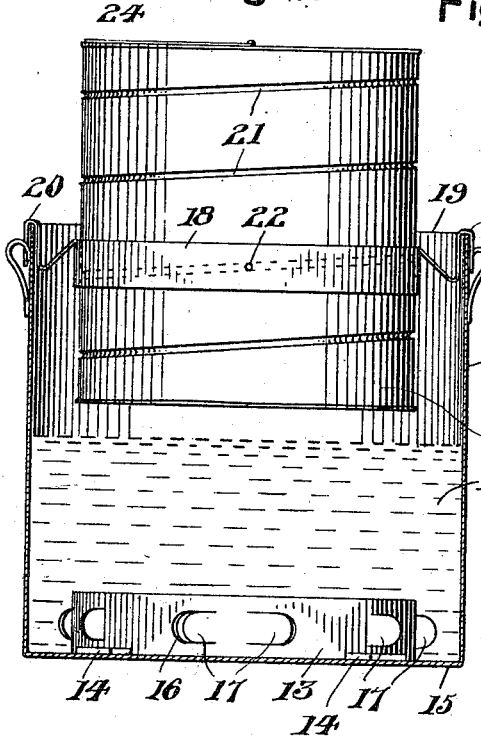
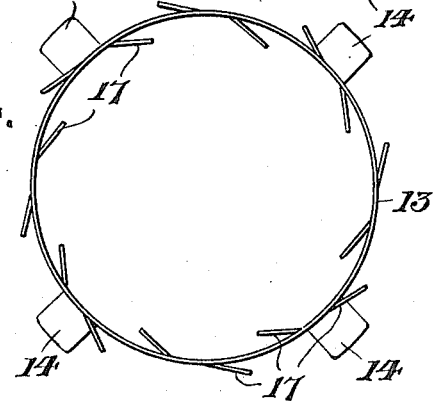
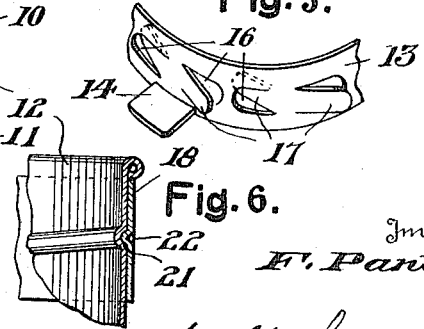
Inventor
F. Pantlik
By A. M. Wilson
Attorney.

UNITED STATES PATENT OFFICE.

FRANK PANTLIK, OF BARRACKVILLE, WEST VIRGINIA.

MILK-BOILER.

1,209,752.  Specification of Letters Patent.  Patented Dec. 26, 1916.

Application filed September 11, 1916. Serial No. 119,503.

*To all whom it may concern:*

Be it known that I, FRANK PANTLIK, a subject of the King of Hungary, residing at Barrackville, in the county of Marion and State of West Virginia, have invented certain new and useful Improvements in Milk-Boilers, of which the following is a specification.

This invention relates to new and useful improvements in milk boilers.

The primary object of the invention is the provision of a boiler especially adapted for heating and boiling milk, the same being divided with a means for circulating the water during the boiling operation and also having a ready means for elevating the milk container.

A further object of the device is the provision of a double boiler having a container for things to be boiled, the same being readily elevated relatively of the boiling fluid by rotarily moving the said container.

In the drawing forming a part of this application and in which like designating characters refer to corresponding parts throughout the several views:—Figure 1 is a vertical central sectional view through the outer member of the device, the members contained therein being in side elevation. Fig. 2 is a similar view with the lid of the outer container removed and the inner container elevated. Fig. 3 is a top plan view of the device with the lid partially broken away. Fig. 4 is a top plan view of the fluid circulator employed with the device. Fig. 5 is a perspective view of a portion of the latter, and Fig. 6 is a detail sectional view of an upper portion of the inner container with a portion of the mounting ring therefor.

The invention being in the nature of a double boiler especially adapted for boiling milk, the same broadly consists of a receptacle 10 provided with water 11 therein to a convenient height while a container 12 for the articles to be boiled is vertically adjustably arranged within the receptacle 10.

A circulator 13 in the form of an annulus having outwardly extending radially arranged base plates 14 is positioned within the receptacle 10 upon the bottom 15 thereof being provided with perforations 16 formed by oppositely bent lips 17. The container 12 is adapted to rest upon the annulus 13 when the container is in its lowered position within the water 11, the boiling of the latter effecting a circulation of the water through the openings 16 of the said annulus whereby the water 11 in the container 12 is quickly and advantageously heated.

A mounting ring 18 is arranged within the receptacle 10 adjacent the top thereof being suspended from the top edge 19 of the receptacle by means of hooks 20 carried by the said ring and overlying the said edge. The container 12 is provided with a spiral peripheral groove 21 within which opposite struck in lugs 22 of the ring 18 are seated whereby the revolving of the container 12 vertically moves the said container positioning the same as found desirable.

A lid 23 is hinged upon the top of the receptacle 10 while a bail 24 is provided for the container 12.

The complete operation of the device will be apparent, it being understood that during the boiling operation the container 12 is mounted upon the annulus 13 seated within the water 11, the lid 13 being closed. When the contents such as milk within the container 12 is sufficiently heated the lid 23 is opened and the container 12 revolved within the ring 18 elevating the container upon the surface of the water 11 as best illustrated in Fig. 2 of the drawing and in which position the contents may be maintained in a warm condition.

What I claim as new is:—

1. A device of the class described comprising a receptacle, an annular water circulator arranged upon the bottom thereof, a ring removably positioned within the said receptacle and supported by the receptacle adjacent the upper end thereof and an adjustable container carried by the said ring and seated upon the said circulator when in its normal lowered position, the said container being vertically adjustable relative to the circulator and ring.

2. A device of the class described comprising a receptacle, a mounting ring having inwardly struck lugs, hooks carried by the said ring removably mounted upon the top edge of the receptacle, a container arranged within the said ring and having a spiral peripheral groove within which the said lugs are positioned, whereby the container is vertically shiftable during the relative rotation of the container within the said ring and a bail for the said container, an annulus seated upon the bottom of the said receptacle and having alternate oppositely struck lips forming a plurality of perforations therethrough and outwardly extending radial base plates carried by the said annulus seated upon the said receptacle bottom, the said container being normally positioned upon said annulus during the operation of the device.

In testimony whereof I affix my signature.

FRANK PANTLIK.